US005183426A

United States Patent [19]

Ho-jin et al.

[11] Patent Number: 5,183,426

[45] Date of Patent: Feb. 2, 1993

[54] SHADOW MASK STRETCHING APPARATUS FOR FLAT CATHODE RAY TUBE

[75] Inventors: Cho Ho-jin, Seoul; Sang-sin Choi, Anyang, both of Rep. of Korea

[73] Assignee: Samsung Electron Devices Co., Ltd., Kyunggi, Rep. of Korea

[21] Appl. No.: 660,607

[22] Filed: Feb. 27, 1991

[51] Int. Cl.[5] ........................ H01J 9/236; B23P 11/02

[52] U.S. Cl. ........................................ 445/68; 445/30; 29/448

[58] Field of Search ................ 445/30, 68, 67; 29/448

[56] References Cited

U.S. PATENT DOCUMENTS 3,704,511 12/1972 Hooker ................................ 445/30
4,562,634 1/1986 Watts .................................... 29/448
4,704,094 11/1987 Stempfle .............................. 445/30

FOREIGN PATENT DOCUMENTS 0121628 10/1984 European Pat. Off. .............. 445/30

*Primary Examiner*—Richard K. Seidel
*Assistant Examiner*—Jeffrey T. Knapp
*Attorney, Agent, or Firm*—Cushman, Darby & Cushman

[57] ABSTRACT

A foil-type shadow mask stretching apparatus for a flat cathode ray tube comprises a clamping device in the shape of an elipse, a circle, other similar shapes. The clamping device has a clamping lane with inclined projections arranged in a tooth-like manner; a ring-shaped push pad having a shape abuttingly compatible with to the clamping lane, and C-shaped clamping rings for tightly pressing the push pad onto the clamping lane, whereby the shadow mask is clamped between the clamping lane and the push pad. The shadow mask stretching apparatus prevents abnormal deformation and wrinkling caused by contraction of a shadow mask.

2 Claims, 4 Drawing Sheets

SHADOW MASK STRETCHING APPARATUS FOR FLAT CATHODE RAY TUBE

FIELD OF THE INVENTION

The present invention relates to a shadow mask stretching apparatus for a flat cathode ray tube, and particularly to an improved apparatus for stretching a foil type shadow mask capable of preventing deformation caused by contraction of the shadow mask.

BACKGROUND OF THE INVENTION

General flat cathode ray tubes are minutely described in U.S. Pat. Nos. 4,695,761, 4,710,670, and 4,716,334. The common characteristic of these flat cathode ray tubes is that a foil type shadow mask of the flat faceplate is fixed by a substantially rectangular rim which is bonded to the periphery of the inner surface of the faceplate.

In order to weld the shadow mask to the rim of the flat cathode ray tube, the shadow mask is mounted to an apparatus for tensely stretching the peripheral portion of the shadow mask by extension force applied by the apparatus. Under the condition that the shadow mask is tensely stretched, the shadow mask is welded to the rim which has been bonded to the faceplate.

An example of the aforesaid shadow mask stretching apparatus is illustrated in FIG. 1A and FIG. 1B, and the related art is described in U.S. Pat. No. 4,790,789.

The conventional stretching apparatus 10 includes a rectangular space 12 confined by a frame 11, and a clamping means 15 of a shadow mask 30 formed at the periphery of the frame 11. The clamping means 15 consists of clamping channel 16 and a clamping clip 17 for being fitted into the clamping channel 16. A pair of opposite jaws 16*a* are formed at the upper portion of the clamping channel 16, and the clamping clip 17 to be coupled with the channel 16 is a plate bent to be in "Ω" shape.

The process for fixing the shadow mask 30 to the conventional shadow mask stretching apparatus is as follows.

The shadow mask 30 is placed on the stretching apparatus 10. Then, a pair of platens having a heater therein, which is described in U.S. Pat. No. 4,722,238 for example, are employed for heating the shadow mask 30.

When the shadow mask 30 is sufficiently heated to undergo thermal expansion to a certain extent, a plurality of the clips 17 as a coupling means are respectively inserted into each channel 16 formed in the frame 11 of the stretching apparatus, so that the periphery of the foil type shadow mask 30 is coupled to the frame 11 of the stretching apparatus by the clips 17, as shown in FIG. 1B.

The shadow mask 30 mounted to the stretching apparatus 10 is tensed by cooling to make the periphery of the shadow mask 30 be tightly strained against the stretching apparatus 10 under a constant tensile force.

While the shadow mask is mounted to the stretching apparatus, the faceplate corresponding to the shadow mask is paired together to be processed in a manufacturing process of a phosphor layer.

After the process for forming the phosphor layer on the faceplate is completed, the shadow mask mounted to the stretching apparatus is welded to the rim which is bonded to the faceplate. The shadow mask is then separated from the stretching apparatus, thereby finishing the mounting of the shadow mask to the faceplate.

As shown in FIG. 2, the disadvantages of the conventional stretching apparatus 10 which is employed in the aforesaid process are that the frame 11 of the stretching apparatus is in a rectangular shape, and the clamping means provided thereto is also in a rectangular shape, so that the tensile forces at the center portion and at the corner portion of each side are different from each other. That is, the expansions of the shadow mask along the diagonal direction and along the parallel direction of each side are different from each other by the initial tensile force applied to the shadow mask upon cooling, and the tensile force applied along each direction of the shadow mask is accordingly different from each other. Therefore, the shadow mask is abnormally expanded to result in undesirable deformation of the electron beam passing apertures formed in the shadow mask, or, wrinkling of the shadow mask at the corner portions thereof in some cases. Consequently, the quality of the product is deteriorated, and a realization of a high definition image of television becomes difficult.

SUMMARY OF THE INVENTION

Therefore, it is an object of the present invention to provide a shadow mask stretching apparatus for a flat cathode ray tube capable of preventing abnormal deformation and the local wrinkling of a shadow mask.

To achieve the above object, the shadow mask stretching apparatus according to the present invention comprises a space confined by a frame of the stretching apparatus and a clamping means of the shadow mask formed at the periphery of the space, wherein the clamping means is formed in a shape of an ellipse, a circle, or other similar shapes and fixes the foil type shadow mask to the frame of the stretching apparatus along the clamping line.

In a preferred embodiment of the stretching apparatus according to the present invention as mentioned above, the space confined by frame, has a circumferential shape of a circle, an ellipse, or another similar shape.

In another preferred embodiment of the stretching apparatus according to the present invention, an improved clamping means comprises a clamping lane arranged in the frame, having a plurality of projections respectively formed in a tooth form of a predetermined width along a line in the shape of the circumference having an elliptical, a circular, or other similar shape; a ring-shaped clamping pad having the shape corresponding to the toothed-shape of the clamping lane; and a fixing means for fixing the clamping pad to the frame.

In another preferred embodiment of the stretching apparatus according to the present invention, the clamping lane and the clamping pad respectively have inclined contact planes having a predetermined angle with the plane of the shadow mask mounted to the frame.

In a still other preferred embodiment of the stretching apparatus according to the present invention, the fixing means includes an annular groove formed along the inner side of the frame; and a plurality of C-shaped clamping rings having a plurality of flanges elastically inserted into the groove for pressing a shadow mask push pad onto a projected border.

BRIEF DESCRIPTION OF THE DRAWINGS

The above object and other advantages of the present invention will become more apparent by describing in detail the preferred embodiments of the present invention with reference to the attached drawings in which.

DETAILED DESCRIPTION OF THE INVENTION

Figure 1A:
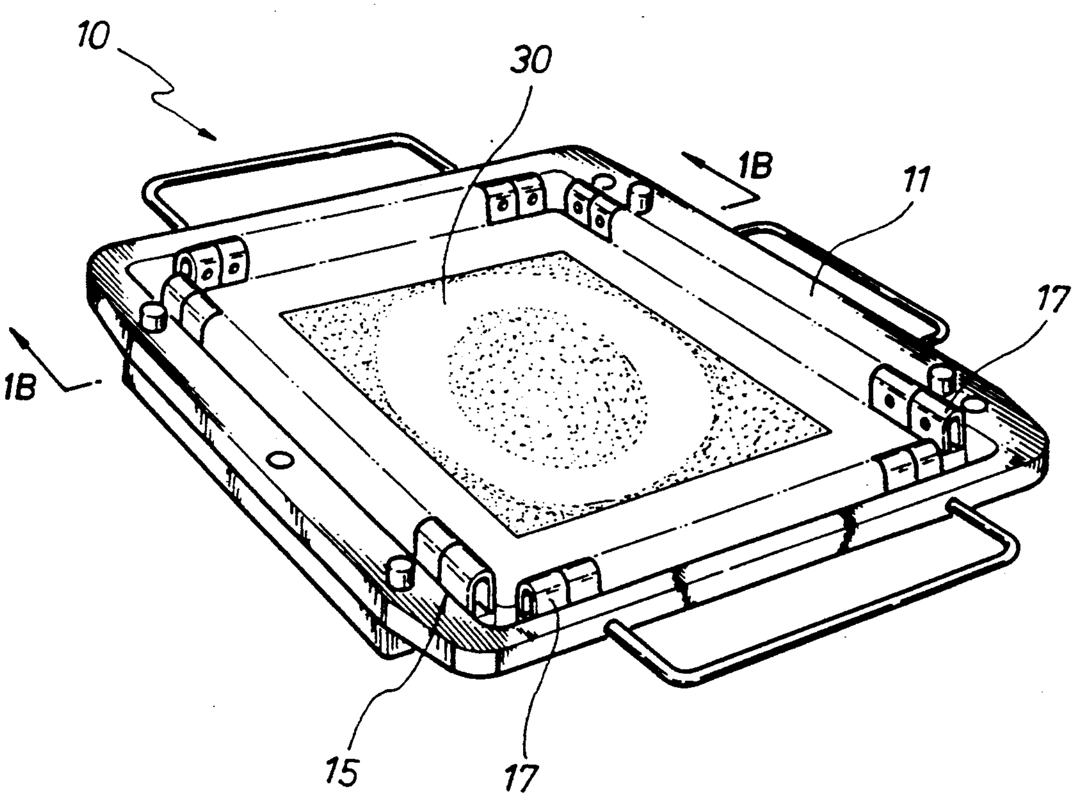
FIG. 1A (PRIOR ART)
FIG. 1A is a perspective view of a conventional shadow mask stretching apparatus for a flat cathode ray tube.
Figure 1B:
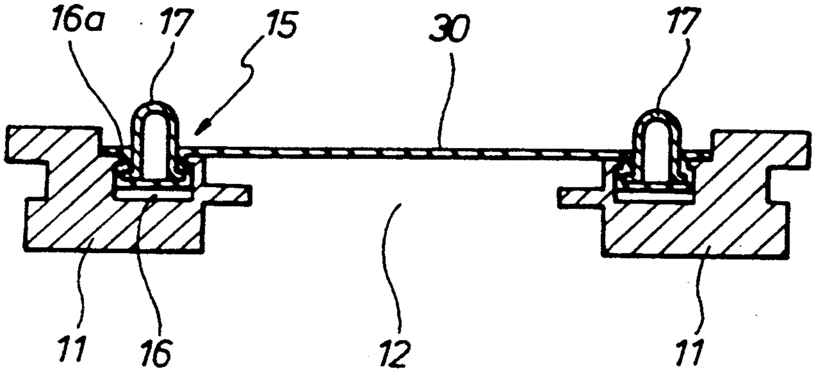
FIG. 1B (PRIOR ART)
FIG. 1B is a sectional view taken along line A–A' in FIG. 1A.
Figure 2:
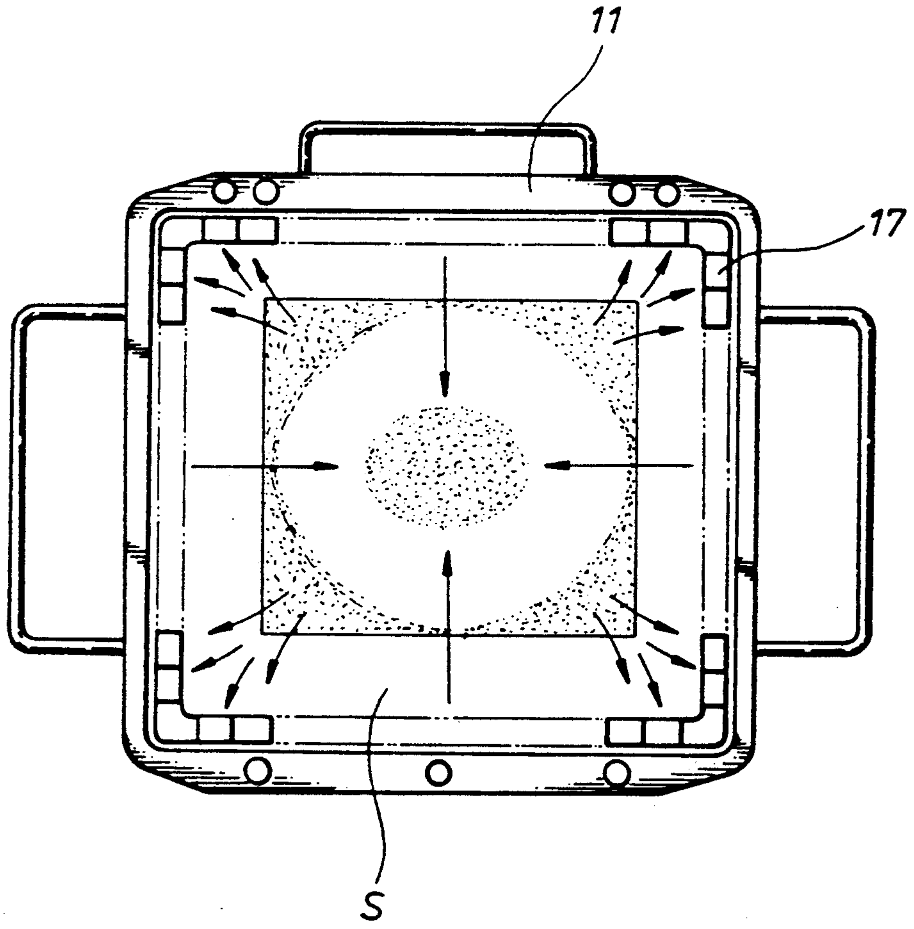
FIG. 2(PRIOR ART)
FIG. 2 is a plan view of the stretching apparatus, shown in FIGS. 1A and 2B, which is retaining the shadow mask, for visualizing the deformation of the shadow mask by contraction.
Figure 3:
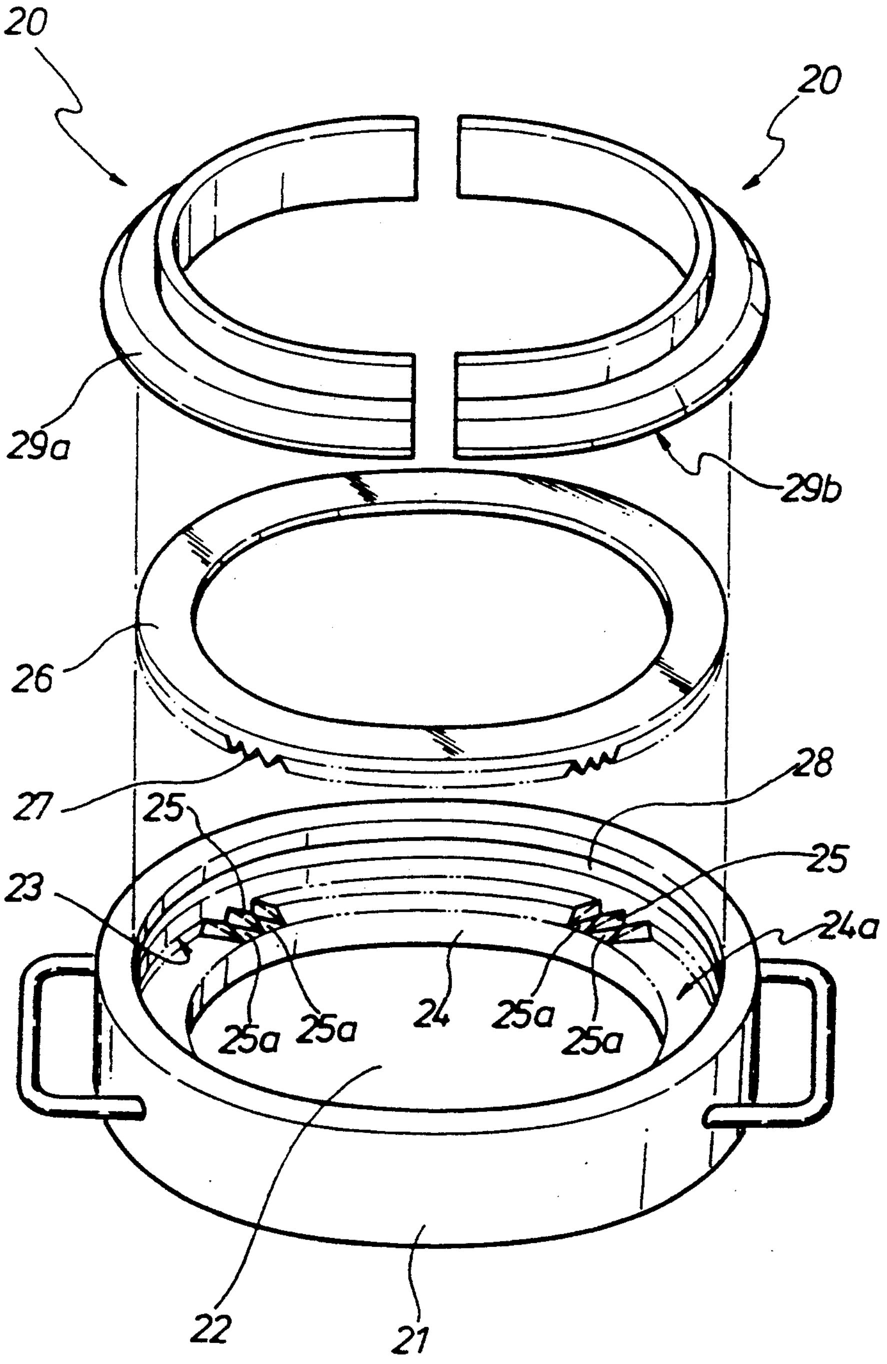
FIG. 3 is an exploded perspective view of a shadow mask stretching apparatus for a flat cathode ray tube according to the present invention.
Figure 4:
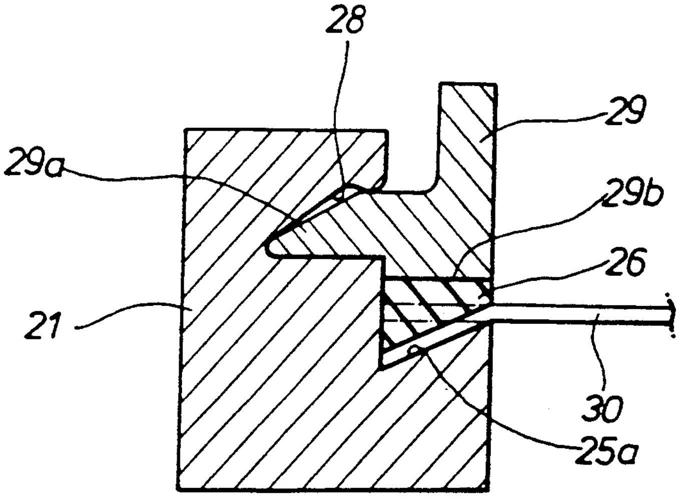
FIG. 4 is a partially extracted enlarged sectional view showing the coupling state of the shadow mask stretching apparatus shown in FIG. 3.

A shadow mask stretching apparatus for a flat cathode ray tube according to the present invention is schematically illustrated in FIG. 3. A space 22 is formed in an elliptic shape within the frame 21 of the stretching apparatus. An inwardly projected border 24 of a predetermined height in an elliptic shape for forming a clamping lane 24*a* is formed along the lower portion of the inner side 23 of the frame 21. An elliptic push pad 26, which will be described later, is engaged with the clamping lane 24*a*, which has arranged projections 25 of a quadrangle with triangular sides. As illustrated in FIG. 4, inclined contact planes 25*a* respectively having a predetermined angle to the plane of the elliptic push pad 26 is provided at the contact portion of the elliptic push pad 26 and the elliptic clamping lane 24*a*. A groove 28 having a predetermined width is formed in the upper portion of the clamping lane 24*a* along the inner side 23 of the frame 21, and a plurality of flanges 29*a* of C-shaped clamping rings 20, which will be described later, are fitted thereto.

Here, the push pad 26 is used for pressing the periphery of the shadow mask to the elliptic clamping lane 24*a*, and has contact planes 27 corresponding to the shape of the clamping lane 24*a* provided at the lower plane thereof. The contact planes 27 of the push pad 26 are formed to have a shape which correspond to the shape of the projections 25 and the inclined contact planes 25*a* of the elliptic clamping lane 24*a*.

The C-shaped clamping ring 20 pushes the push pad 26 positioned on the periphery of the shadow mask 30, and the pad 26, in turn, pushes the mask to the clamping lane 24*a* to be tightly contacted therewith. The clamping ring 20 includes the flange 29*a* to be fitted into the groove 28, and pressing plane 29*b* to contact the upper portion of the push pad 26 as shown in FIG. 4. Since the C-shaped clamping ring 20 should be elastically fitted to the groove 28 in the elliptic space 22, the number of the C-shaped ring 20 should be two or more.

The process for fixing the shadow mask 30 for the flat cathode ray tube to the shadow mask stretching apparatus constructed as the above according to the present invention will be described in detail.

The shadow mask 30 is placed in the inner space of the frame 21 such that the periphery of the shadow mask 30 is placed on the upper portion of the clamping lane 24*a*. Under this condition, after the shadow mask 30 is sufficiently heated to be thermally expanded by conventional upper and lower platens retaining a heater, the push pad 26 is placed on the upper portion of the clamping lane 24*a*, so that the periphery of the shadow mask 30 is provisionally pressed between the push pad 26 and the clamping lane 24*a*.

Then, the C-shaped clamping ring 20 is mounted to the frame 21 of the stretching apparatus in such a manner that the flange 29*a* of the C-shaped clamping ring 20 is fitted into the groove 28 formed along the elliptic inner circumference of the frame 21. Thus, the upper portion of the push pad 26 for pressing the shadow mask 30 is pressed by the pressing plane 29*b* of the C-shaped clamping ring 20.

Successively, the shadow mask 30 becomes cooled to make the shadow mask 30 tightly mounted onto the frame 21 in a predetermined tensile force.

By the above described process, the periphery of the shadow mask 30 is strongly clamped by being sandwiched between the projections 25 and the inclined contact planes 25*a* of the clamping lane 24*a* and the contact planes 27 of the push pad 26 having the shape corresponding to the projections 25 and the inclined contact planes 25*a*.

Figure 5:
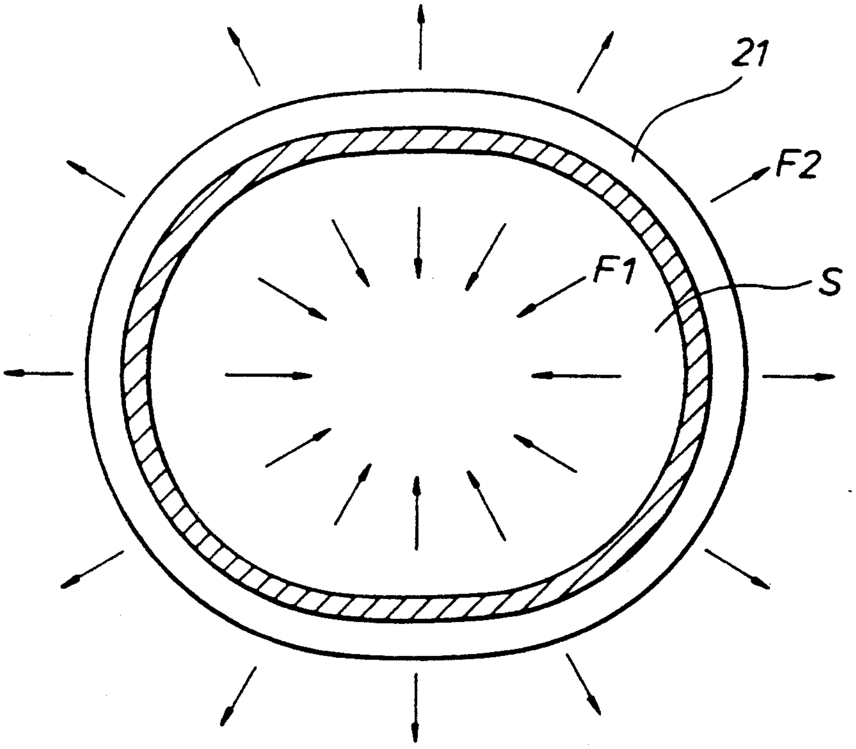
FIG. 5 is a plan view for visualizing thermal stress of the shadow mask fixed to the stretching apparatus for the flat cathode ray tube shown in FIG. 3.

According to the present invention, any abnormal deformation of the shadow mask caused by thermal stress can be prevented by the shadow mask stretching apparatus. the relation between the contraction force F1 caused by cooling-down the shadow mask and the clamping force F2 caused by the push pad 26 of the shadow mask 30 is illustrated in FIG. 5. The contraction force F1 is directed toward the center portion from the periphery of the shadow mask 30, and the clamping force F2 is directed opposite to the contraction force F1. Then, the contraction force F1 and the clamping force F2 are radially oriented in elliptic manner around the center portion of the shadow mask. As a result, a local wrinkling is not brought out in the shadow mask, and, further, uniform tensile force is applied thereto.

As described above, the abnormal deformation of the shadow mask by thermal stress is efficiently prevented in the present invention, thereby suppressing the abnormal deformation of the beam passing apertures formed in the shadow mask. Therefore, according to the present invention, the phosphor screen of a good quality can be formed onto the faceplate as the shadow mask is clamped to the stretching apparatus in an optimum condition.

What is claimed is:

1. A shadow mask stretching apparatus for a flat cathode ray tube comprising:

an annular frame having a clamping lane projecting radially inward, said clamping lane having a plurality of projections respectively formed on a surface thereof; and clamping means for clamping a shadow mask to said frame to stretch the shadow mask within said frame, said clamping means comprising an annular clamping pad having a surface with a contour abuttingly compatible to the contour of the surface of said clamping lane, and fixing means for fixing said clamping pad to said frame, said shadow mask being clamped between said surfaces of said clamping lane and said clamping pad, wherein:

said frame comprises an annular groove formed along an inner surface above said clamping lane; and said fixing means comprises a plurality of C-shaped clamping rings having a plurality of flanges elastically insertable into said groove.

2. A shadow mask stretching apparatus for a flat cathode ray tube comprising:

an annular frame having a clamping lane projecting radially inward, said clamping lane having a plurality of projections respectively formed on a surface thereof; and, clamping means for clamping a shadow mask to said frame to stretch the shadow mask within said frame, said clamping means comprising an annular clamping pad having a surface with a contour abuttingly compatible to the contour of the surface of said clamping lane, and fixing means for fixing said clamping pad to said frame, said shadow mask being clamped between said surfaces of said clamping lane and said clamping pad, wherein:

said frame comprises an annular groove formed along an inner surface above said clamping lane;

said fixing means comprises a plurality of C-shaped clamping rings having a plurality of flanges elastically insertable into said groove; and said surfaces of said clamping lane and said clamping pad have respective inclined contact planes of a predetermined angle.

* * * * *